US011231261B2

(12) United States Patent
Khangar et al.

(10) Patent No.: US 11,231,261 B2
(45) Date of Patent: Jan. 25, 2022

(54) TAPE MEASURE WITH MULTIPLE SPRING RETRACTION

(71) Applicant: Milwaukee Electric Tool Corporation, Brookfield, WI (US)

(72) Inventors: Abhijeet A. Khangar, Pewaukee, WI (US); Jonathan F. Vitas, Muskego, WI (US); Collin J. Nelson, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 422 days.

(21) Appl. No.: 16/205,996

(22) Filed: Nov. 30, 2018

(65) Prior Publication Data

US 2019/0170491 A1 Jun. 6, 2019

Related U.S. Application Data

(60) Provisional application No. 62/593,625, filed on Dec. 1, 2017.

(51) Int. Cl.
*G01B 3/1041* (2020.01)
*G01B 3/1005* (2020.01)
(Continued)

(52) U.S. Cl.
CPC ......... *G01B 3/1041* (2013.01); *G01B 3/1005* (2013.01); *G01B 3/1056* (2013.01); *G01B 3/1043* (2020.01); *G01B 2003/103* (2013.01)

(58) Field of Classification Search
CPC .. G01B 3/1041; G01B 3/1005; G01B 3/1056; G01B 3/1043; G01B 2003/103
See application file for complete search history.

(56) References Cited

U.S. PATENT DOCUMENTS 1,057,543 A * 4/1913 Green .................... B60R 22/44
242/372
1,110,759 A * 9/1914 Earll ....................... B60L 5/14
191/93
(Continued)

FOREIGN PATENT DOCUMENTS

CN 203422033 2/2014
EP 0022230 5/1984
(Continued)

OTHER PUBLICATIONS

ProTool Reviews website material, Dewalt XP Tape Measure Review, available at https://www.protoolreviews.com/tools/hand/measuring-levels/dewalt-xp-tape-measure/30217/ dated Jul. 13, 2017, 16 pages.
(Continued)

*Primary Examiner* — Nimeshkumar D Patel
*Assistant Examiner* — Tania Courson
(74) *Attorney, Agent, or Firm* — Reinhart Boerner Van Deuren s.c.

(57) ABSTRACT

A tool, such as a tape measure, including a spring-based retraction system is shown. The spring-based retraction system includes at least two springs that drive a tape spool during tape retraction. The springs are indirectly coupled to each other via a single center post, in one embodiment, two center posts on a single spool, in another embodiment, or two center posts that are on different spools, in another embodiment.

21 Claims, 12 Drawing Sheets

(51) Int. Cl.
*G01B 3/1056* (2020.01)
*G01B 3/1043* (2020.01)

(56) References Cited

U.S. PATENT DOCUMENTS

| | | | | |
|---|---|---|---|---|
| 2,036,720 | A | | 4/1936 | Ritter |
| 2,614,769 | A | * | 10/1952 | Nicholson ............ G01B 3/1056 |
| | | | | 242/375 |
| 3,929,210 | A | * | 12/1975 | Cutler .................... H02G 11/02 |
| | | | | 191/12.2 R |
| 4,232,837 | A | * | 11/1980 | Cutler .................. B65H 75/486 |
| | | | | 242/372 |
| 4,402,472 | A | | 6/1983 | Burtscher |
| 4,502,226 | A | | 3/1985 | Hung |
| 4,527,334 | A | * | 7/1985 | Jones .................... G01B 3/1005 |
| | | | | 33/761 |
| 4,756,087 | A | | 7/1988 | Sing |
| 4,972,601 | A | * | 11/1990 | Bickford .............. G01B 3/1056 |
| | | | | 33/770 |
| 4,982,910 | A | * | 1/1991 | Bickford .............. G01B 3/1056 |
| | | | | 242/375 |
| 6,398,145 | B1 | * | 6/2002 | Yang .................... B65H 75/486 |
| | | | | 242/375 |
| 6,766,588 | B1 | * | 7/2004 | Hsu ...................... G01B 3/1005 |
| | | | | 33/755 |
| 6,964,114 | B1 | * | 11/2005 | Chen .................... G01B 3/1005 |
| | | | | 242/371 |
| 7,003,895 | B2 | * | 2/2006 | Harris .................. G01B 3/1005 |
| | | | | 33/755 |
| 9,207,058 | B2 | | 12/2015 | Delneo |
| 10,227,205 | B2 | * | 3/2019 | Delneo .................. B65H 75/30 |
| 10,458,771 | B2 | * | 10/2019 | Nelson ................. H05K 999/99 |
| 10,836,603 | B2 | * | 11/2020 | Vitas .................... G01B 3/1005 |
| 2011/0099828 | A1 | * | 5/2011 | Hernandez ........... G01B 3/1084 |
| | | | | 33/757 |
| 2020/0033108 | A1 | * | 1/2020 | Vitas .................... G01B 3/1005 |

FOREIGN PATENT DOCUMENTS

| | | |
|---|---|---|
| JP | H4-1402 | 1/1992 |
| JP | H6-2102 | 1/1994 |
| JP | 06-028602 | 4/1994 |

OTHER PUBLICATIONS

Translation of JP06-028602, dated Apr. 15, 1994, KDS Corporation.
Translation of JPH4-1402, dated Jan. 8, 1992, Tadaki Imai.
Translation of JPH6-2102, dated Jan. 14, 1994, Hiroshi Shirai.

* cited by examiner

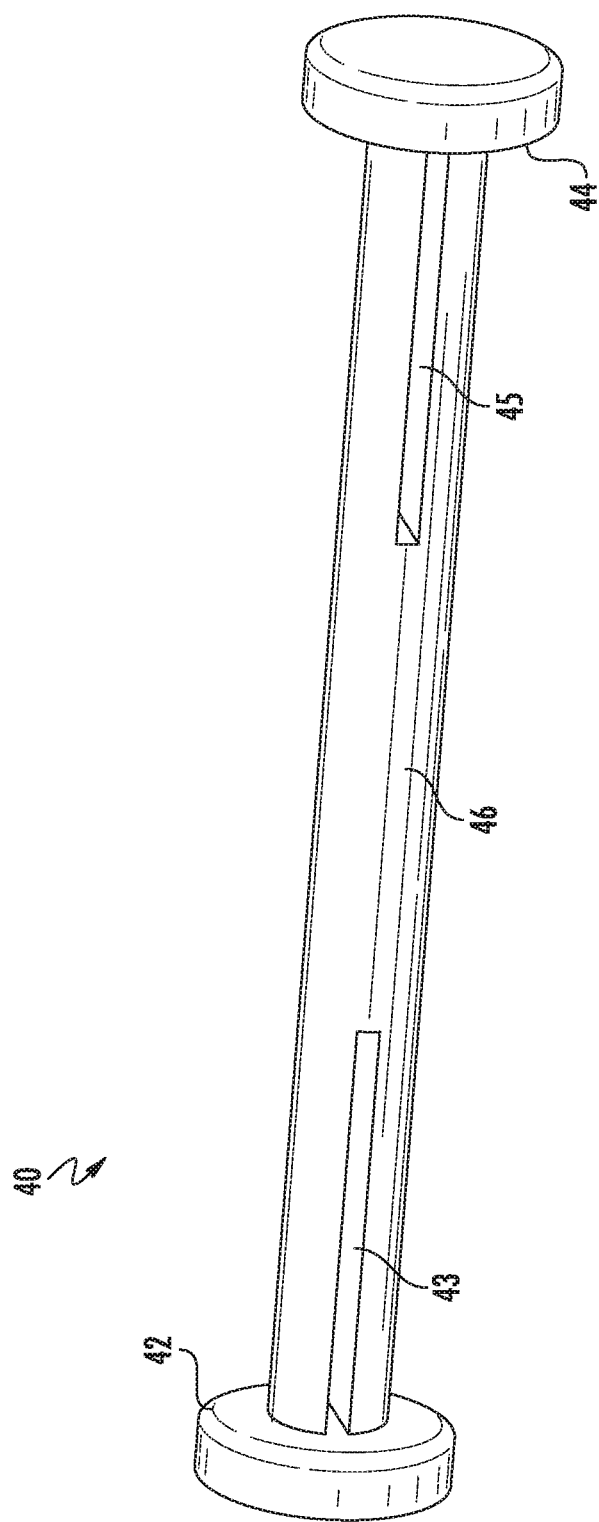

TAPE MEASURE WITH MULTIPLE SPRING RETRACTION

CROSS-REFERENCE TO RELATED PATENT APPLICATIONS

This application claims priority to and the benefit from U.S. Provisional Application No. 62/593,625, filed Dec. 1, 2017, the contents of which is incorporated herein in its entirety

BACKGROUND OF THE INVENTION

The present invention relates generally to the field of tools. The present invention relates specifically to a tape measure, measuring tape, retractable rule, etc., that includes a spring-based retraction system having an arrangement of multiple springs and in a specific embodiment, the multiple springs function in series.

Tape measures are measurement tools used for a variety of measurement applications, including in the building and construction trades. Some tape measures include a graduated, marked blade wound on a reel and also include a retraction system for automatically retracting the blade onto the reel. In some typical tape measure designs, the retraction system is driven by a coil or spiral spring that is tensioned. The spring stores energy as the tape is extended and releases energy to spin the reel and wind the blade back onto the reel as the tape is retracted.

SUMMARY OF THE INVENTION

In general, the invention described herein relates to a tape measure utilizing a retraction system with at least two springs, and in specific embodiments, the at least two springs are arranged such that they function in series with each other. In one or more embodiments the spring-based retraction system uses a single center post that transfers torque between two springs as a tape blade is paid out from a tape measure housing. In a first embodiment, as a tape blade is paid out from the tape measure housing, a tape spool is rotated around an axis of the tape measure. One spring, which is coupled to the tape spool and the center post, transfers force from the tape spool to the center post. Another spring transfers force from the center post to the housing of the tape measure. Thus, the energy stored as a result of paying out the tape blade from the tape measure housing is stored equally between the two springs.

In another embodiment, the center post is formed from two center post sections, and the tape measure also includes a spring reel. The first center post section is coupled to (e.g., molded to) the tape spool, and the second center post is coupled to (e.g., is molded to) the housing of the tape measure. As the tape blade is paid out of the tape measure housing, one spring transfers torque from the first center post to the spring reel. The spring reel in turn transfers the force to a second spring, which is also attached to the second center post. Again, the energy stored as a result of paying out the tape blade from the tape measure housing is stored equally between the two springs.

In one embodiment, an attachment piece connects the tape blade to the tape spool. A first wider end of the attachment piece has two tabs that extend laterally from the attachment piece and are coupled to openings in the tape spool. The second end of the attachment piece slides into a slot formed in the tape blade. The second end of the attachment piece similarly has two tabs that extend laterally from the attachment piece and are coupled to the tape blade. The width of the first end of the attachment piece, which couples to the tape spool, is wider than the lateral walls of the tape spool, and the width of the second end of the attachment piece, which couples to the tape blade, is wider than the slot in the tape blade but less wide than the lateral walls of the tape spool. Thus, when retracted, the tape blade and the attachment piece wrap around the tape spool.

In another embodiment, the spring is coupled to the housing via a fastener such as a rivet that slides into a slot. The fastener is sufficiently recessed such that when the fastener is disposed therein, the outside edge of the fastener is flush or below the outside surface of the housing that holds the spring. The fastener being flush or below the surface of the housing may prevent and/or mitigate the fastener from engaging or scraping against the spool and/or the attachment piece when the tape blade is retracted.

In another embodiment, the tape measure includes a central axis that is comprised of two axes co-aligned along their longitudinal axes. The axes are coupled together via protrusions and recesses from a bearing wall at one of their ends, with the protrusions engaging within the recesses. The axes may be biased together via a spring that acts upon at least one of the axes along its longitudinal axis. Alternatively the axes may be fixedly coupled together.

In another embodiment, the tape reel in the tape measure includes internal walls that extend axially inward towards the central axis/arbor. As a result, the bearing surfaces of the tape reel are closer to the center of the axis of rotation, so the area of friction during rotation is reduced, and therefore the total amount of friction is also reduced, thus reducing the amount of force lost to friction when the tape blade is extended or retracted from the housing.

BRIEF DESCRIPTION OF THE DRAWINGS

FIG. 4 is a perspective view of the center post in FIG. 1, according to an exemplary embodiment.

DETAILED DESCRIPTION

Referring generally to the figures, various embodiments of a tape measure and elements thereof are shown. Various embodiments of the tape measure discussed herein include an innovative retraction system including a dual spring retraction system.

As will generally be understood, a tape blade is coupled to a tape spool in a tape measure. As described herein, in one embodiment the tape blade is coupled to the tape spool by virtue of an attachment piece. A first end of the attachment piece is coupled to openings in the lateral walls of the tape spool. The second end of the attachment piece slides into a slot formed in the tape blade. Both ends of the attachment piece include tabs that project laterally and permit more secure coupling. The first end of the attachment piece, which couples to the tape spool, is wider than the tape spool, and the second end of the attachment piece, which couples to the tape blade, is wider than the slot in the tape blade.

In another embodiment, the spring in the tape measure is coupled to the housing via a fastener such as a rivet that slides into a slot in the housing. When the fastener is disposed within the slot it is sufficiently recessed such that the fastener is flush or below the outside surface of the housing that holds the spring. Thus, the fastener does not scrape or engage with the tape blade and/or the attachment piece.

In another embodiment, the center post is formed from two center post sections. The first center post is molded to a tape spool, and the second center post is molded to the housing of the tape measure. As the tape blade is paid out and/or pulled out of the tape measure housing, one spring transfers torque from the first center post to the spring reel. The spring reel in turn transfers the force to a second spring, which is attached to the second center post. Thus, the energy of the tape measure is shared between the two springs, which are indirectly coupled via the tape spool.

In another embodiment, the center post is made of two center posts that are coupled together, such as being rigidly coupled so that the center posts do not rotate with respect to each other. The center posts may be biased together via a spring to decrease the chance of the center posts de-coupling. Alternatively, the center posts may be fixedly coupled together, such as via welding.

In another embodiment, the tape reel includes internal walls that extend towards the axle. As a result, the bearing surface of the tape reel has a reduced area, which reduces the amount of energy lost to friction during rotation of the tape reel.

Figure 5A:
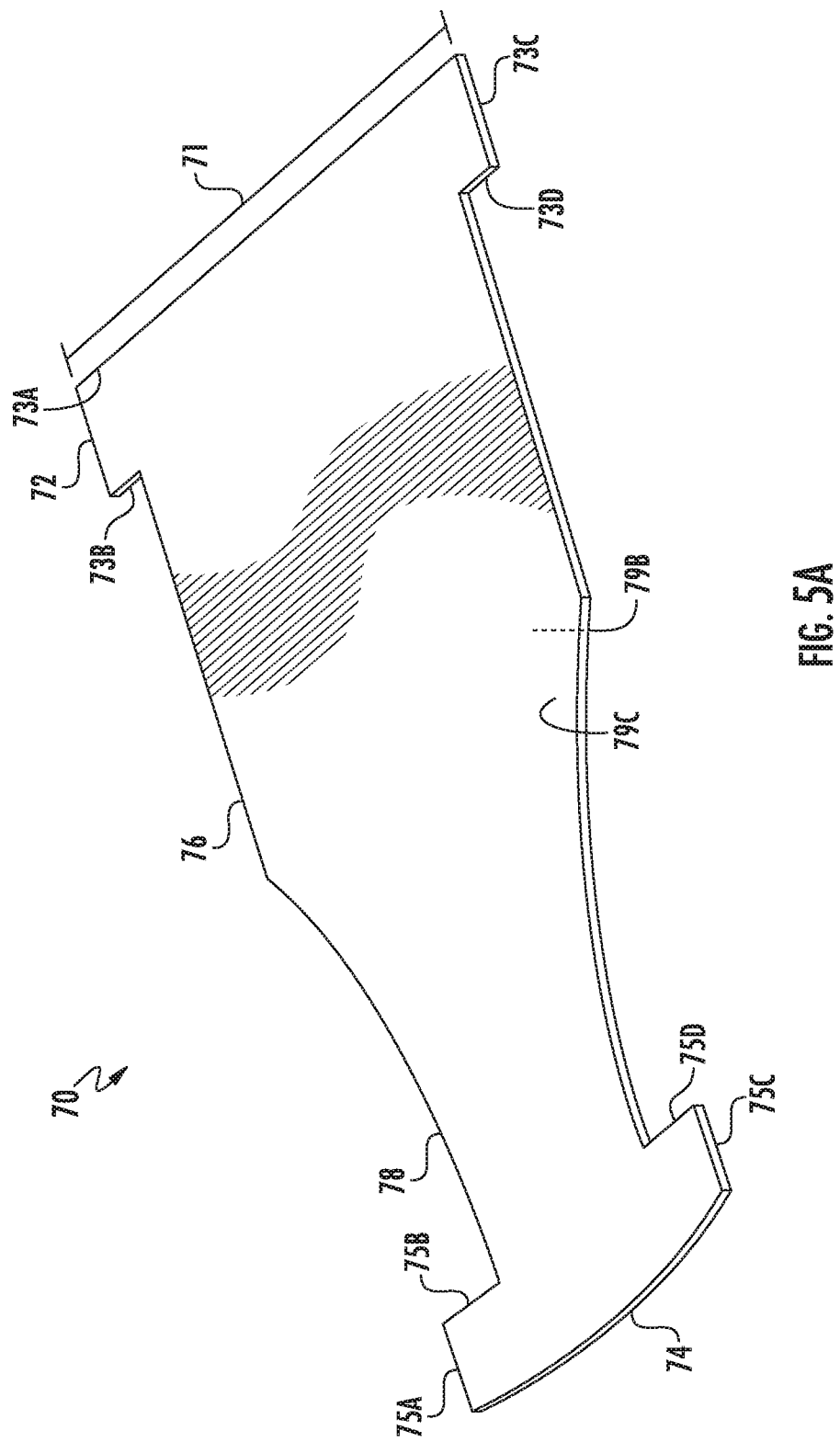
FIG. 5A is a perspective view of a tape blade attachment component, according to an exemplary embodiment.
Figure 5B:
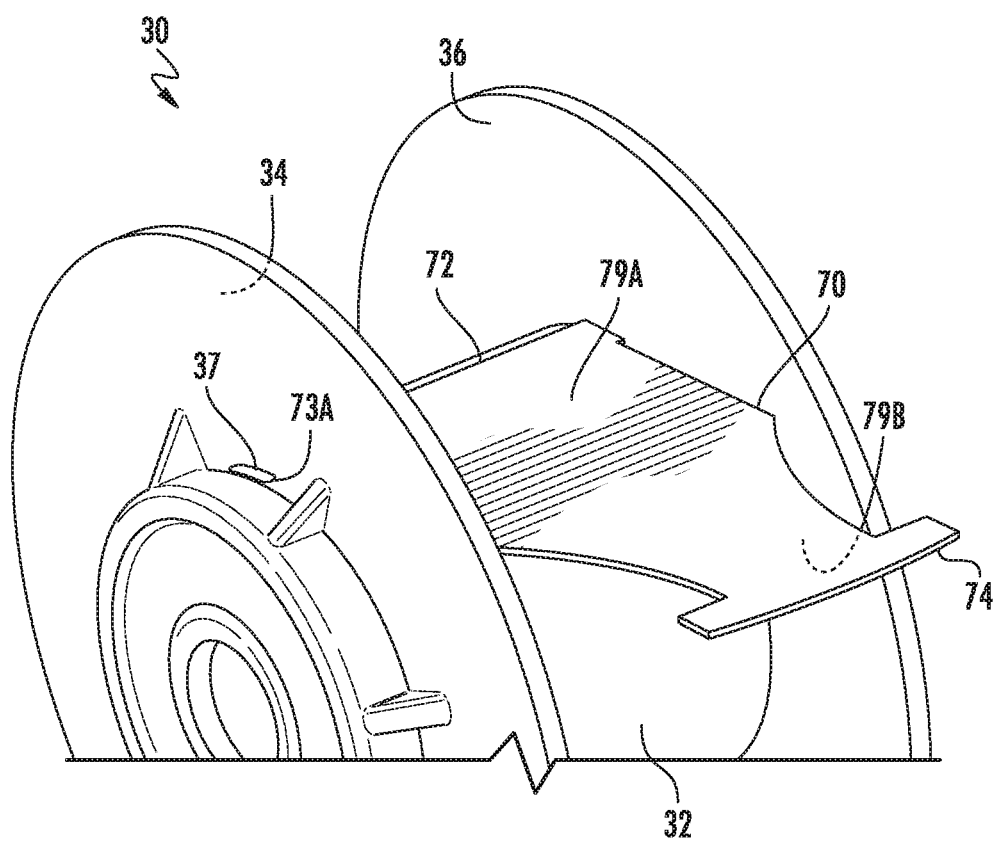
FIG. 5B is a perspective view of the tape blade attachment component of FIG. 4A attached to the tape spool shown in FIG. 1, according to an exemplary embodiment.
Figure 6A:
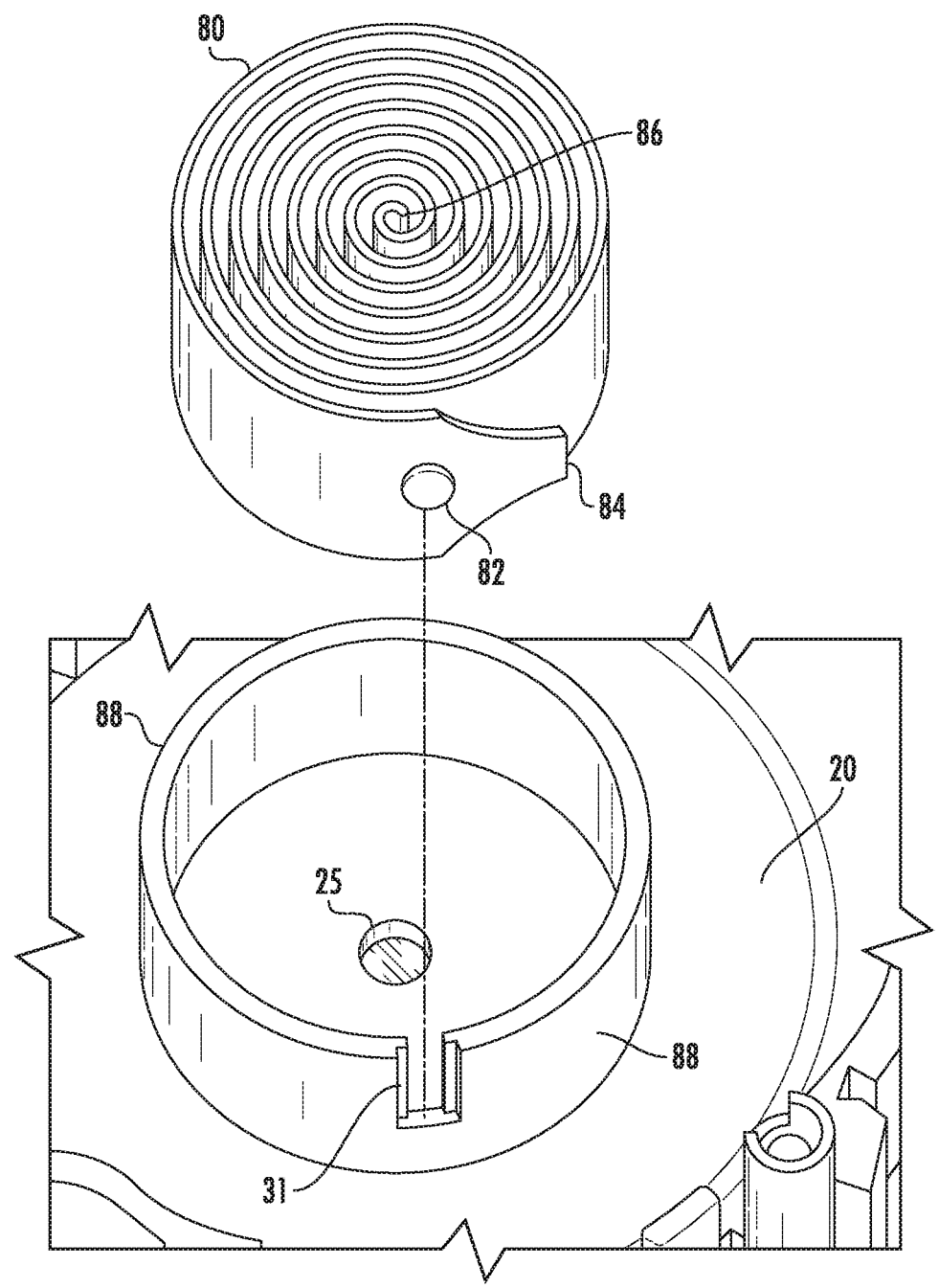
FIG. 6A is a perspective view of a tape measure spring with a fastener and a portion of a tape measure housing including a slot for receipt of the spring fastener, according to an exemplary embodiment.
Figure 6B:
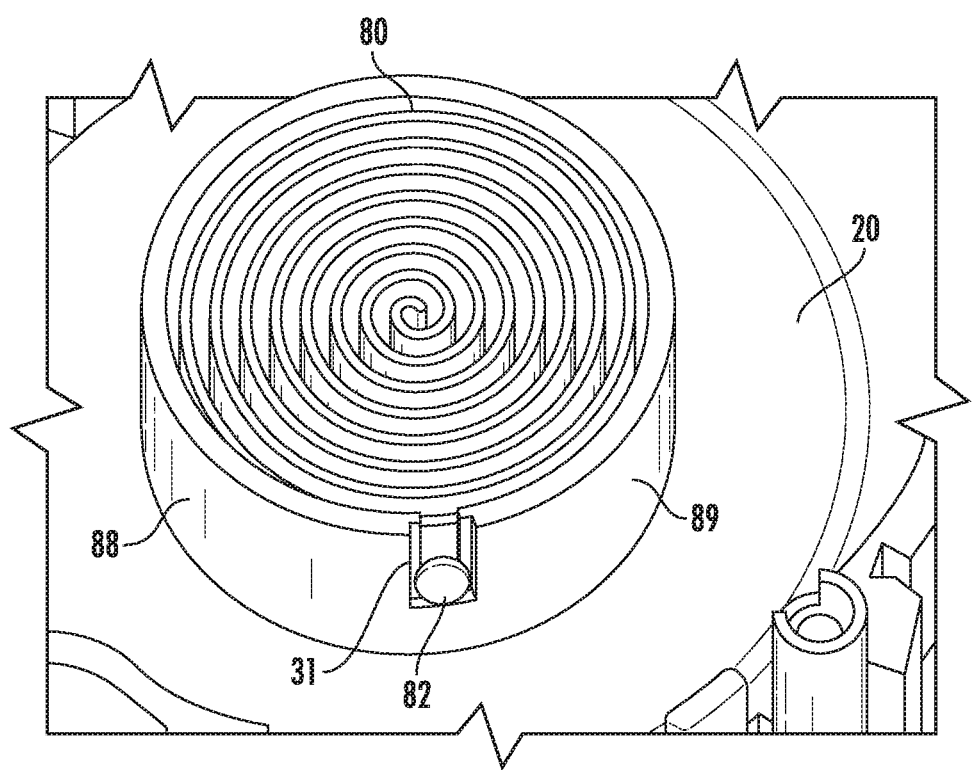
FIG. 6B is a perspective view of the tape measure spring fastener of FIG. 5A received within the slot of the tape measure housing of FIG. 5A.

Referring to FIGS. 1-6B, a length measurement device, tape measure, measuring tape, retractable rule, etc., such as tape measure 10, is shown according to an exemplary embodiment. In this exemplary embodiment, tape measure 10 includes a housing 20, a tape spool 30, a center post 40, spring enclosures 50, a tape blade 60 (best shown in FIG. 3), an attachment piece 70 (best shown FIGS. 5A and 5B), and springs 80 (an example of one of the springs 80 is shown in FIGS. 6A and 6B).

In this exemplary embodiment, housing 20 encompasses springs 80, tape spool 30, and, when retracted, tape blade 60. Housing 20 includes a front housing 22 and a back housing 24. Housing 20 further includes an opening 25 (best shown in FIG. 6A) that receives one end of the center post 40, and a cylindrical protrusion wall 26 that receives and surrounds one of the springs 80 (best shown in FIG. 2).

Tape spool 30 is utilized to hold tape blade 60 via radially securing tape blade 60 around tape spool 30 when tape blade 60 is at least partially retracted. In general, tape spool 30 includes interior wall 32 of the tape spool 30, a first lateral wall 34 of the tape spool 30, and a second lateral wall 36 of the tape spool 30.

Center post 40 axially rotates generally near a center of the housing and is utilized to couple the springs so they function in series. The center post 40 includes a first end 42 and a second end 44. Center post 40 includes first cavity 43 and second cavity 45 (best shown in FIG. 4) and a middle 46 there between. In one embodiment, center post 40 comprises two separate pieces that are coupled together to form a single center post 40. In another embodiment, center post 40 comprises a single object, thereby removing and/or reducing the chance that center post 40 may become decoupled, thus causing failure of tape measure 10.

In general, center post 40 axially rotates around axis 28. In one or more embodiments, ends 42 and 44 of center post 40 are located within housing 20, thereby allowing center post 40 to rotate around axis 28 independent of housing 20.

FIG. 4 shows an exemplary embodiment of center post 40. In one or more embodiments contemplated herein, center post 40 includes a first cavity 43 and a second cavity 45, which are utilized to attach spring 80 to center post 40. For example, looking at both FIG. 4 and FIG. 6A, internal end 86 of the first spring is attached to first cavity 43, and internal end 86 of the second spring is attached to second cavity 45. In this way the first spring and the second spring are indirectly coupled to each other via center post 40. It is contemplated herein that the first cavity 43 and second cavity 45 may each be a blind slot or an open slot. In one embodiment, internal ends 86 of the first spring and the second spring may be coupled to center post 40 via an end cap. It is further contemplated herein that internal ends 86 of the first spring and the second spring may be coupled to center post 40 via other means.

Figure 1:
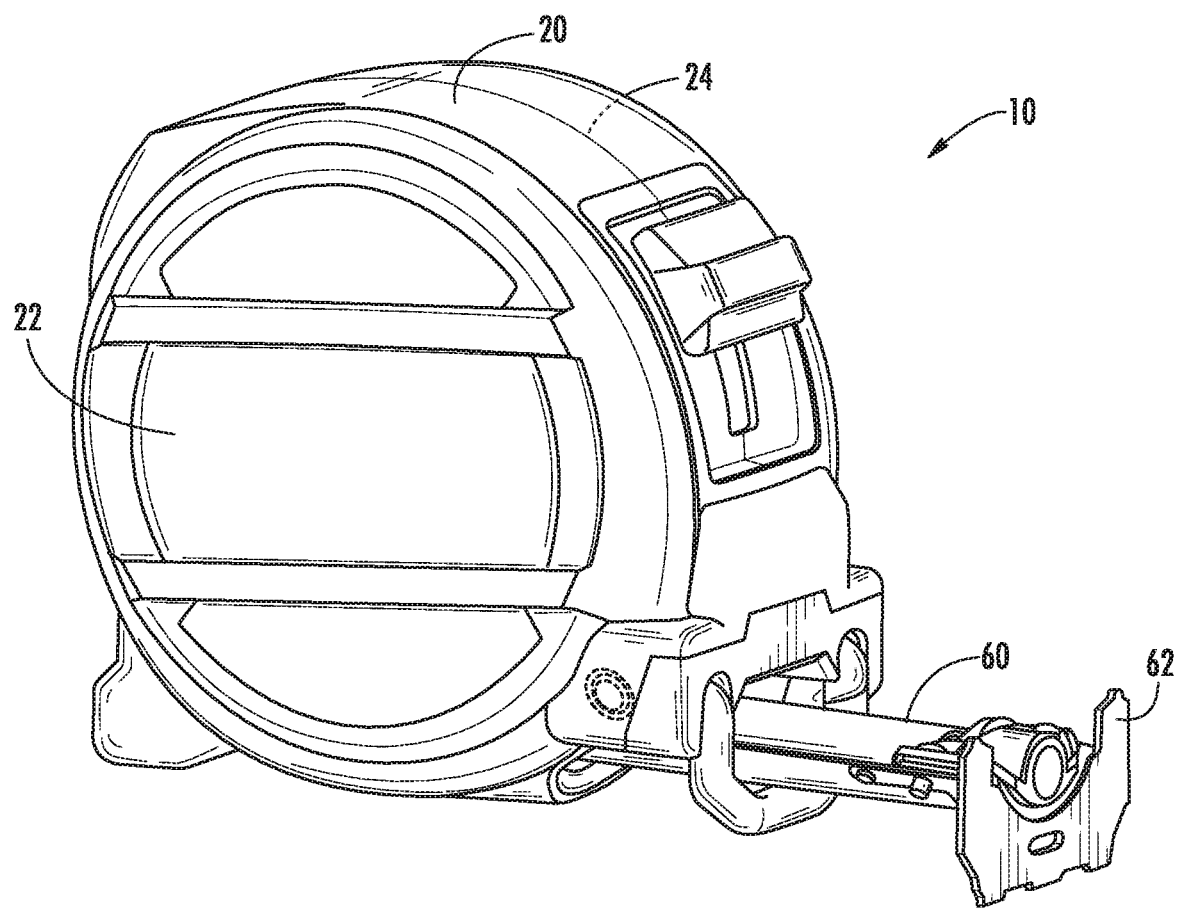
FIG. 1 is a perspective view of a tape measure, according to an exemplary embodiment.
Figure 2:
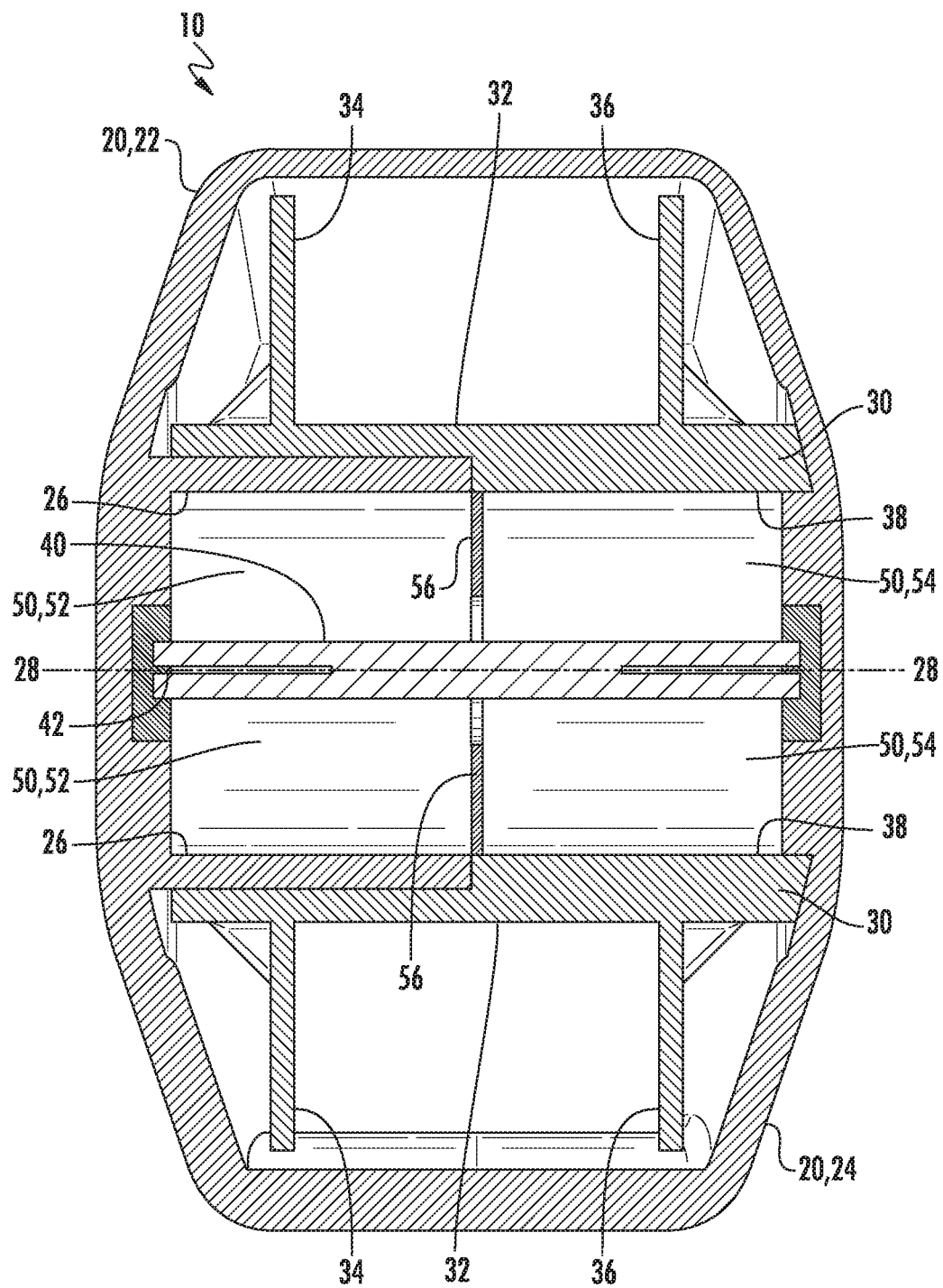
FIG. 2 is a front cross-sectional view of a tape measure, according to an exemplary embodiment.

In general, the spring enclosures 50 include a first spring enclosure 52, on the left side of FIG. 2, and a second spring enclosure 54, on the right side of FIG. 2. In general, spring enclosures 50 are defined at least partially within tape spool 30.

Looking now at the first spring enclosure 52 on the left side of FIG. 2, in one or more embodiments a first spring is wrapped around a portion of center post 40 disposed between front housing 22 and a separation wall 56 located between the adjacent springs 80, and a second spring is wrapped around a portion of center post 40 disposed between back housing 24 and separation wall 56. The first spring and the second spring are coiled or wound to store energy during extension of tape blade 60, and when they are permitted to unwind or uncoil they drive the rewinding of tape blade 60 onto tape spool 30 during retraction of tape blade 60.

As an exemplary embodiment of how spring 80 may wrap around center post 40, we turn now to FIG. 6A. In FIG. 6A spring 80 is a flat spiral spring, although it is contemplated herein that spring may alternatively be other configurations. In FIG. 6B, spring 80 is disposed within spring enclosure 88, whereby fastener 82 of spring 80 is attached to spring slot 31. In the exemplary embodiment of FIG. 6A, spring 80 is disposed against housing 20 inside of spring enclosure 88.

Referring to FIGS. 2 and 6A, the first spring in FIG. 2 is disposed within first spring enclosure 52 on the left side of FIG. 2. In this configuration, the lateral edges of spring 80 (shown in FIG. 6A as the top edge and the hidden bottom edge) are disposed against separation wall 56 and front housing 22. Similarly, the second spring in FIG. 2 is disposed within second spring enclosure 54 on the right side of FIG. 2. In this configuration, the lateral edges of spring 80 are disposed against separation wall 56 and back housing 24.

The tape blade 60 may include a tape blade hook 62, which is preferably attached to an outer end of tape blade 60 that protrudes from the housing 20 of the tape measure 10 (best shown in FIG. 3), as well as an internal end 64 of the tape blade 60. The tape blade 60 may be an elongated strip of material including a plurality of graduated measurement markings, and in specific embodiments, tape blade 60 is an elongated strip of metal material (e.g., steel material) that includes an outer most end coupled to a hook assembly 62. Tape blade 60 may include various coatings (e.g., polymer coating layers) to help protect tape blade 60 and/or the graduated markings of the tape blade 60 from wear, breakage, etc. In various embodiments, tape blade 60 includes an elongate strip of metal covered in a polymer coating. In a specific embodiment, tape blade 60 has a metal thickness of less 0.13 mm, specifically between 0.09 mm and 0.13 mm.

Attachment piece 70 facilitates coupling tape blade 60 to tape spool 30. In general, attachment piece 70 has a first end 72 and a second end 74, whereby in one or more embodiments first end 72 is wider than second end 74 (e.g., the embodiment in FIG. 5A). Each of the ends of the attachment piece 70 has ears or tabs, with a first tab 73A and a second tab 73C protruding laterally from first end 72, and a third tab 75A and a fourth tab 75C protruding laterally from second end 74. Each of the tabs has an interior edge (e.g., first interior edge 73B for first tab 73A, second interior edge 73D for second tab 73C, third interior edge 75B for third tab 75A, and fourth interior edge 75D for fourth tab 75C). The attachment piece 70 has a top face 79A and a bottom face 79B. In one or more embodiments the attachment piece 70 includes a main body 76 and a tapered portion 78 (e.g., the embodiment in FIG. 5A).

One aspect and/or advantage of utilizing attachment piece 70 is that both springs 80 may be completely enclosed by tape spool 30. This configuration may facilitate manufacture by virtue of springs 80 not needing to be fed through a slot in tape spool 30.

However, it is contemplated herein that attachment piece 70 may not be utilized in the tape measure and instead tape blade 60 is attached to tape spool 30, such as by, for exemplary purposes only and without limitation, being welded, riveted, or otherwise fastened to tape spool 30. In embodiments that utilize this approach, springs 80 may still be enclosed within tape spool 30.

As shown in FIGS. 5A and 5B, attachment piece 70 is utilized to secure tape blade 60 to tape measure 10 according to an exemplary embodiment. In FIG. 2, tape blade 60 is attached to tape spool 30 via first end 72 of attachment piece 70. Looking at FIG. 5B in particular, first and second tabs 73A and 73C are inserted into corresponding tape spool attachment slots 37 in tape spool 30. The width 71 of first end 72 of attachment piece 70 is greater than the distance between first lateral wall 34 of tape spool 30 and second lateral wall 36 of tape spool 30. This relative sizing allows tabs 73A and 73C to extend into slots 37, and the engagement between tabs 73A and 73C couples attachment piece 70 to tape spool 30. In other words, tabs 73A and 73C are sized such that width 71 is greater than a width measured between opposing inner surfaces of lateral walls 34 and 36 of tape spool 30. Thus, interior edges 73B and 73D of attachment piece 70, when disposed within tape spool attachment slots 37 in tape spool 30, are configured to transfer lateral force exerted upon attachment piece 70 into rotational motion of tape spool 30, and vice versa. The second end 74 of attachment piece 70 is less wide than the distance between first and second lateral walls 34, 36 of tape spool 30. Thus the second end 74 of attachment piece 70 fits within the lateral walls of tape spool 30.

In one embodiment, attachment piece 70 is not used and tape blade 60 is coupled directly to tape spool 30. In this embodiment, tabs are formed at one end of tape blade 60 to attach to tape spool 30, such as by forming tape blade 60 a uniform width wider than tape spool 30, and subsequently removing material from the length of tape blade 60 except for a small portion at the end of tape blade 60 which is coupled to tape spool 30.

Tape blade 60 is attached to second end 74 of attachment piece 70 via tabs 75A and 75C. In one embodiment, second end 74 of attachment piece 70 is coupled to a slot formed in tape blade 60. In this embodiment, tape blade 60 includes a slot near the internal end 64 of tape blade 60 that attachment piece 70 is slid into. The slot near the internal end 64 of tape blade 60 runs perpendicular to the length of tape blade 60 and the width of the slot is smaller than the width of tabs 75A and 75C. Therefore, when second end 74 is placed within the slot the engagement between tabs 75A and 75C couples attachment piece 70 to tape blade 60.

Fastener 82 facilitates coupling spring 80 to housing 20 (best shown FIG. 6A). In one or more embodiments, spring 80 includes a fastener 82, which is disposed near an outer end 84 of spring 80, and which is opposite an interior end 86 of spring 80. In the embodiment shown, fastener 82 is a post or projection that extends radially outward away from a radially outward facing surface of spring 80.

In one or more embodiments, when fastener 82 is attached to slot 31 (best shown in FIG. 6B), fastener 82 is disposed beneath an outer surface 89 of spring enclosure 88. Fastener 82 is sized relative to slot 31 such that when fastener 82 is received into slot 31, fastener 82 does not extend radially beyond the radially outward facing surface 89 of spring enclosure 88. Applicant has found that by a flush or recessed positioning of fastener 82 relative to outer facing surface 89, rubbing between spring enclosure 88 and tape spool 30 is prevented during rotation of the tape spool 30. One aspect and/or advantage of this configuration is that fastener 82 of spring 80 can be more easily slid into slot 31 while spring 80 is coiled than when other coupling approaches are utilized (e.g., spot welding spring 80 to spool 30). This configuration of coupling fastener 82 with slot 31 also more easily permits center post 40 and tape spool 30 to optionally consist of a single piece, although it is contemplated herein that center post 40 and/or tape spool 30 may each consist of multiple pieces (e.g., two pieces).

Figure 3:
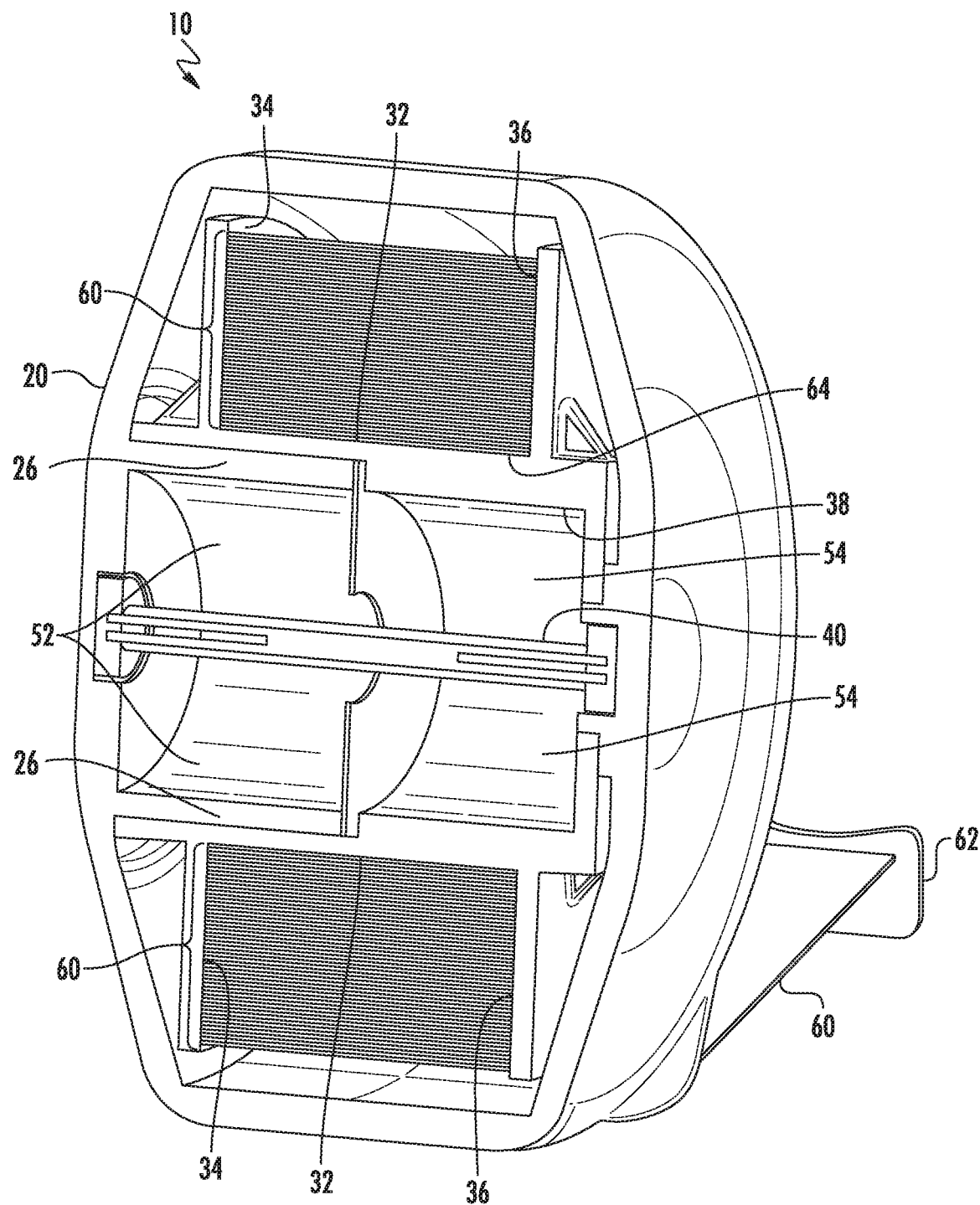
FIG. 3 is a cross-sectional perspective view of the tape measure of FIG. 1 showing a tape measure blade, according to an exemplary embodiment.

Turning now to FIG. 3, tape measure 10 is shown in a perspective view with tape blade 60 partially disposed within housing 20. The portion of tape blade 60 that is disposed within housing 20 is located between first lateral wall 34 and second lateral wall 36 of tape spool 30. The interior portion of tape blade 60 is attached to tape spool 30 via attachment piece 70 (best shown in FIGS. 5A and 5B).

In use, in a retracted state, tape blade 60 is mostly disposed within tape measure 10 (see FIG. 3 for an exemplary embodiment) around tape spool 30. When a user pulls on blade hook 62 of tape blade 60, a portion of tape blade 60 is removed from housing 20. As tape blade 60 is extracted/extended from housing 20, tape spool 30 rotates to feed tape blade 60 out of housing 20. Correspondingly, when tape spool 30 rotates then second spring 80 located in second spring enclosure 54 also rotates and applies torque to center post 40. The center post 40, in turn, also rotates and applies torque to first spring 80 located in first spring enclosure 52. The first spring 80 is secured to center post 40 and cylindrical wall 26 of housing 20 (best shown in FIG. 2). Thus, the rotation of tape spool 30 ultimately exerts a retraction force on both the first spring and the second spring that is equally shared between the two springs, which are simultaneously actuated (i.e., tensioned). For each rotation of tape spool 30 each of the first and second springs are only rotated one-half of a turn each.

As shown in FIG. 3, the non-extended portion of tape blade 60 is wound onto tape spool 30, which is surrounded by housing 20. Tape spool 30 is rotatably disposed about an axis 28 of tape measure 10, and the first and second springs are coupled to tape spool 30 and configured to drive tape spool 30 about rotation axis 28, which in turn provides powered retraction of tape blade 60. In various embodiments, tape measure 10 may include a tape lock that selectively engages tape blade 60, which acts to hold tape blade 60 and tape spool 30 in place such that an extended segment of tape blade 60 remains at a desired length.

In one or more embodiments contemplated herein the first spring and the second spring each have the same spring constant. However, it is also contemplated herein that the first spring and the second spring may have different spring constants from each other.

In specific embodiments, the outermost height dimension of housing 20 is less than 3.25 inches and the length of tape blade 60 is between 25 and 50 ft. In another specific embodiment, the outermost height dimension of housing 20 is less than 3.25 inches and the thickness of tape blade 60 is between 0.1 to 0.7 mm, or more specifically is 0.3 to 0.6 mm, or even more specifically at about 0.4 mm (e.g., 0.4 mm plus or minus 10%).

Figure 7:
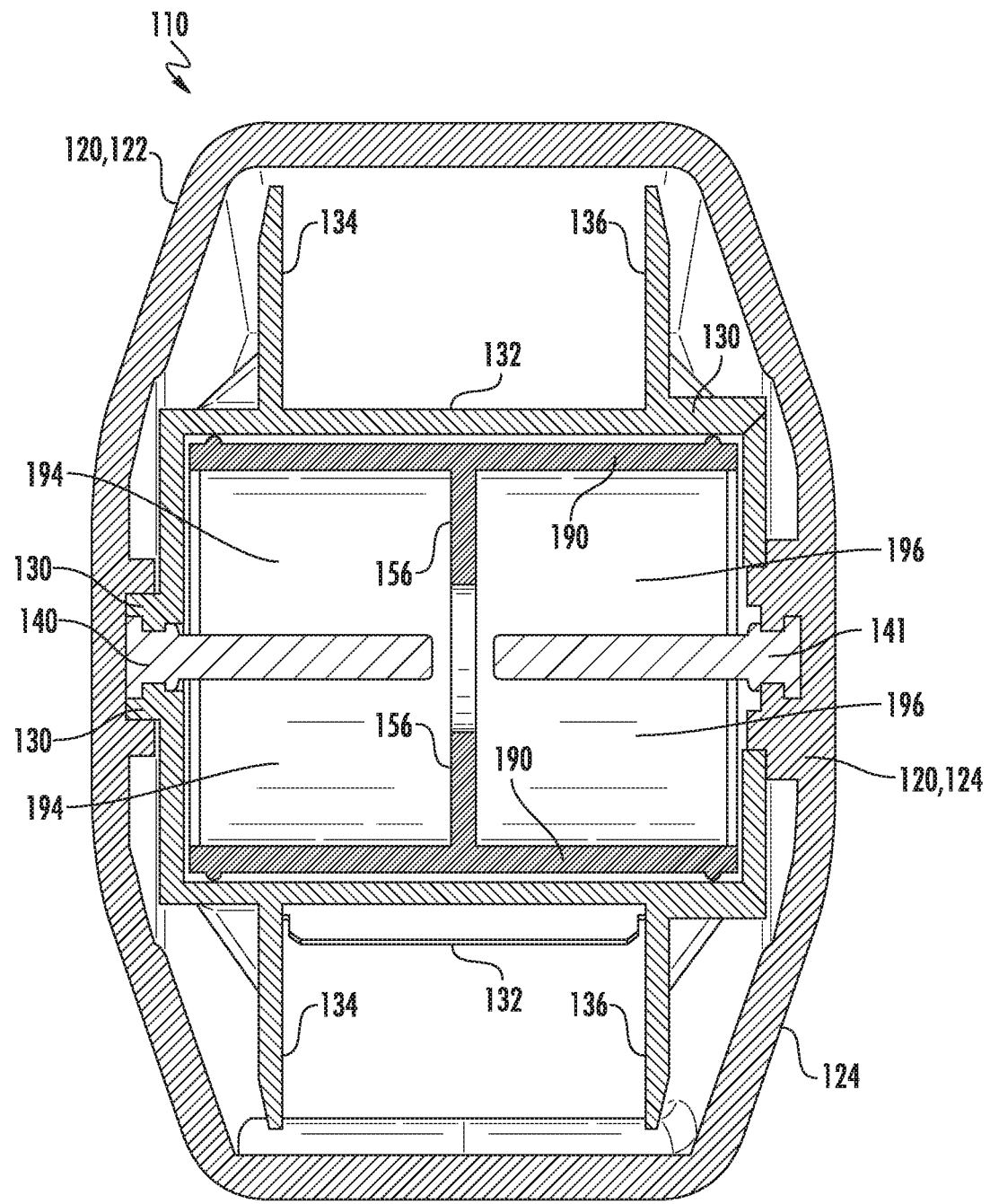
FIG. 7 is a cross-sectional view of a tape measure with two springs functioning in series along two center posts sections, according to an exemplary embodiment.

Referring now to FIG. 7, tape measure 110 is shown according to another exemplary embodiment. Tape measure 110 is substantially similar to tape measure 10, except as discussed herein.

In one or more embodiments, tape measure 110 also includes spring reel 190, which is disposed within tape spool 130. One aspect and/or advantage of this configuration is that, during manufacture, both springs 180 may be installed in their respective chambers in spring spool 190 and spring spool 190 may subsequently be inserted into housing 120.

Tape measure 110 also includes two center posts: first center post 140 and second center post 141. Second center post 141 is insert molded in back housing 124 of housing 120, and first center post 140 is insert molded in tape spool 130.

Similar to the embodiment depicted in FIG. 2, the first spring is disposed within first spring compartment 194 and is coupled to the first center post 140 and tape spool 130. The second spring is disposed within second spring compartment 196 and is coupled to tape spool 30 and second center post 141.

In use, when tape blade 160 is pulled from housing 120, tape spool 130 rotates to feed the tape blade 160. In turn, first center post 140 rotates, which exerts force on the first spring located in the first spring compartment 194 on the left. The first spring exerts torque on spring reel 190, which in turn exerts force on the second spring located in the second spring compartment 196 on the right. The second spring is coupled to second center post 141, which is insert molded to back housing 124. Thus, the force exerted by a user removing tape blade 160 from housing 120 is transferred from tape blade 160 to housing 120 via tape spool 130, first center post 140, the first spring, spring reel 190, the second spring, and second center post 141. As a result, the energy from the retraction is stored equally between the first spring and the second spring. Similar to the embodiment in FIG. 2, for each full turn of tape spool 130, each of the first spring and the second spring are only rotated half of a turn.

Figure 8:
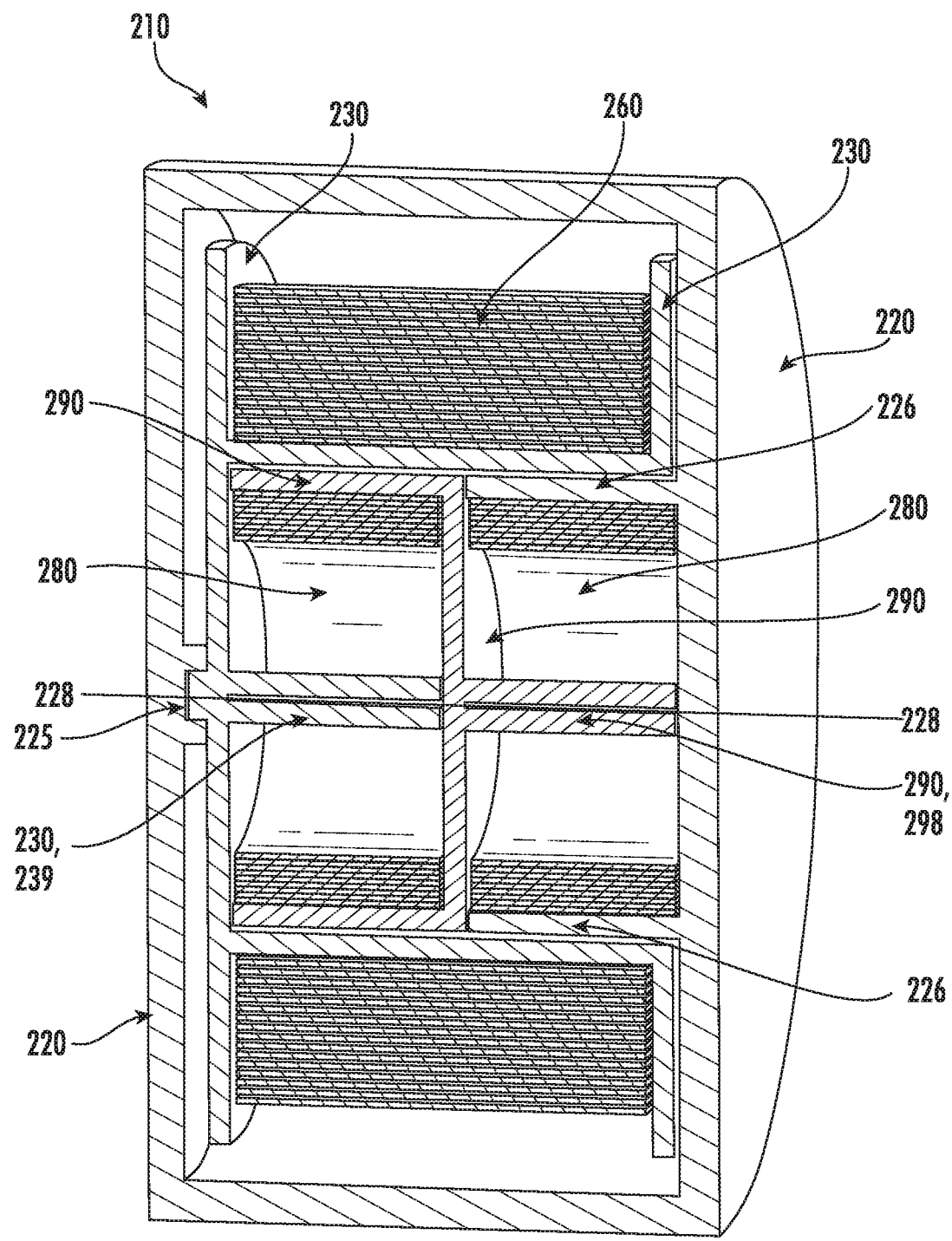
FIG. 8 is a perspective cross-sectional view of a tape measure, according to an exemplary embodiment.
Figure 9:
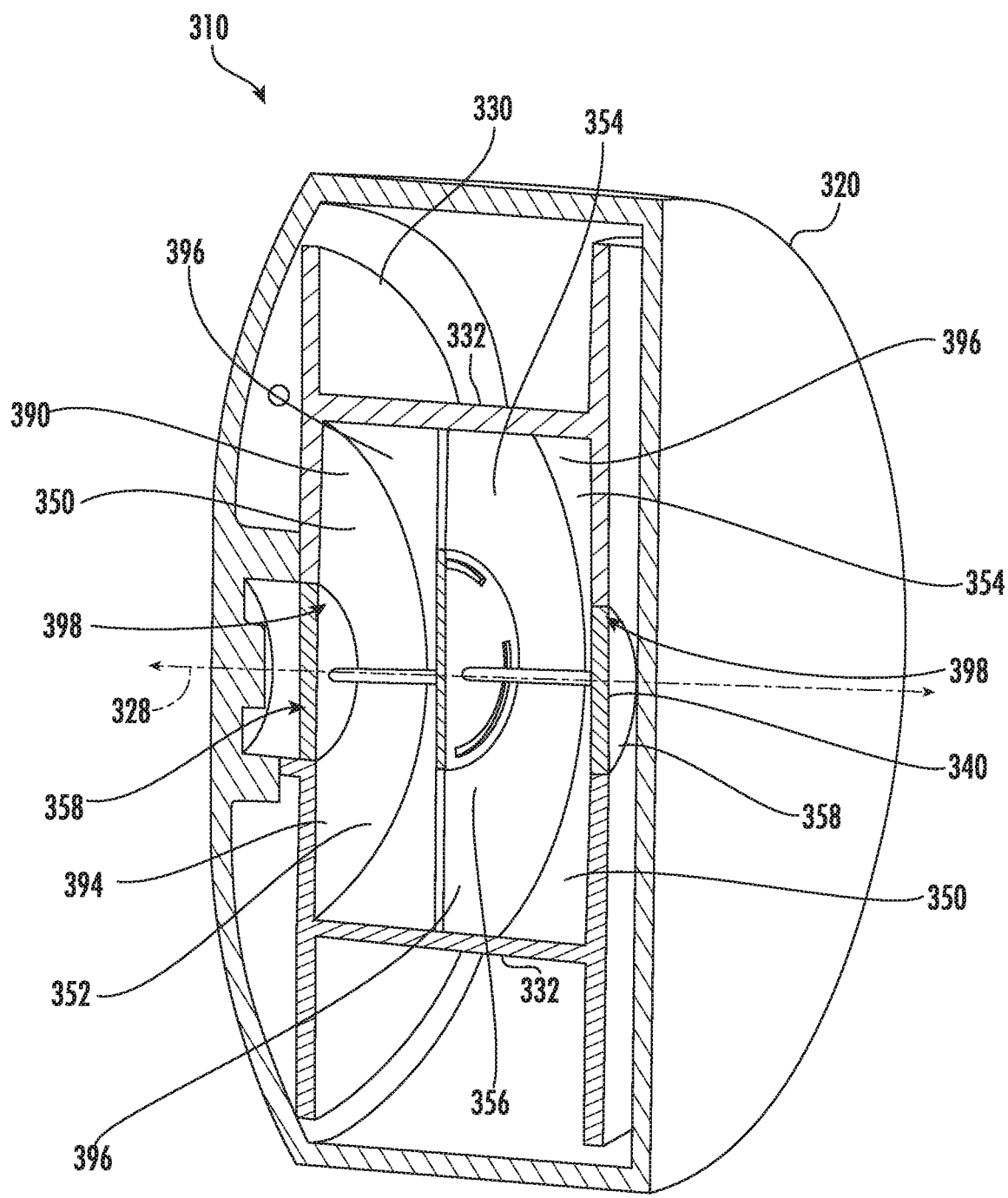
FIG. 9 is a cross-sectional perspective view of a tape measure, according to an exemplary embodiment.

Referring now to FIG. 8, tape spool 230 extends radially through housing 220 and includes tape spool center post 239. Tape spool center post 239 extends laterally through axis 228. Tape measure 210 also includes spring spool 290, which encloses spring 280 on the left side of FIG. 8 and which includes spring spool center post 298. Spring spool center post 298 also extends through axis 228.

For ease of reference only, the "first" spring is located on the left side of FIG. 8 and the "second" spring is located on the right side of FIG. 8. The external end 284 of the first spring is coupled to spring spool 290, and the internal end 286 of the first spring is coupled to tape spool center post 239. The external end 284 of the second spring is coupled to cylindrical wall 226 that is rigidly coupled to housing 220, and the internal end 286 of the second spring is coupled to spring spool center post 298.

In the embodiment shown in FIG. 8, a portion of tape spool center post 239 is disposed within opening 225 in housing 220, thus preferably restricting the movement of tape spool 230 to rotate around axis 228. Further, in the embodiment shown in FIG. 8, a portion of spring spool center post 298 does not extend into a corresponding opening in housing 220. In some embodiments, a portion of tape spool center post 239 and/or spring spool center post 298 is disposed within an opening 225 in housing 220 along axis 228. In another embodiment, no portion of tape spool center post 239 or spring spool center post 298 is disposed within an opening 225 in housing 220 along axis 228.

In use, as tape blade 260 is pulled from housing, tape spool 230 rotates to feed the tape blade 260. In turn, tape spool center post 239 rotates, which exerts force on the first spring located on the left in FIG. 8. The first spring exerts torque on spring reel 290, which in turn exerts force via spring spool center post 298 on the second spring located on the right in FIG. 8. The second spring is coupled to housing 220. Thus, the force exerted by a user removing tape blade 260 from housing 220 is transferred from tape blade 260 to housing 220 via tape spool 230, tape spool center post 239, the first spring, spring reel 290, spring spool center post 298 and the second spring. As a result, the energy from the retraction is stored equally between the first spring and the second spring. Similar to the embodiment in FIG. 2, for each full turn of tape spool 130, each of the first spring and the second spring are only rotated half of a turn.

Turning to FIGS. 9-12, tape measure 310 includes housing 320 surrounding tape spool 330 around which tape blade 60 is wound and springs 80 are enclosed. In use, spool 330 rotates within housing 320 and is supported by axle 340 at bearing surfaces 398. Bearing surfaces 398 axially support spool 330 with respect to the longitudinal axis 328 of axle 340. In one or more embodiments, blade-supporting wall 332, which supports the tape blade when wound within housing 320, is radially further from axis 328 of axis 340 than bearing surfaces 398. Spool 330 includes spring enclosures 350, which include first spring enclosure 352 and second spring enclosure 354 house springs 80.

Spring case 390 is within first spring enclosure 352 and is fixedly secured to housing 320. First spring 80 (not shown)

is enclosed in first spring enclosure 352, and is coupled between cylindrical wall 396 and axle 340. In second spring enclosure 354, second spring 80 (not shown) is coupled between axle 340 and spool 330. Axle 340 rotates and is secured within exterior sleeves 358 and interior sleeves 356.

As tape blade 60 is unwound from tape measure 310, spool 330 rotates with respect to housing 320. One end of second spring 80 in second spring enclosure 354 receives that rotation and transfers it to second center post 344 of axle 340. Second center post 344 is coupled to first center post 342 by their respective interior bearings 348. The rotation of first center post 342 exerts a force on first spring 80, which develops tension against spring case 390, which is fixedly coupled to housing 320. The tension between springs 80 is generally equally shared and is released when springs 80 are permitted to retract tape blade 60 into housing 320.

Figure 10:
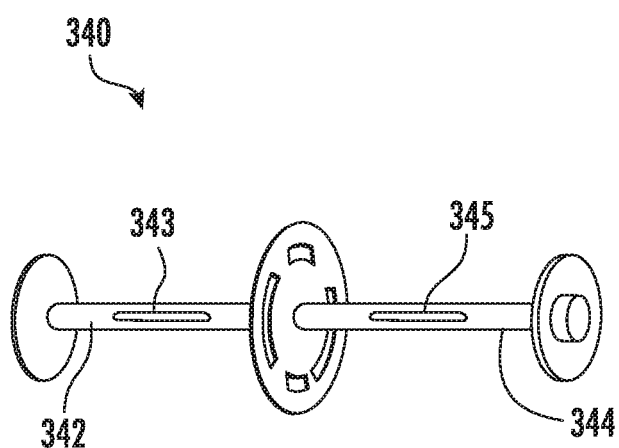
FIG. 10 is a cross-sectional perspective view of the axle in FIG. 9, according to an exemplary embodiment.
Figure 11:
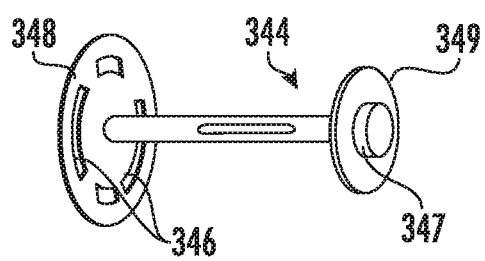
FIG. 11 is a cross-sectional perspective view of the first axle component in FIG. 10, according to an exemplary embodiment.
Figure 12:
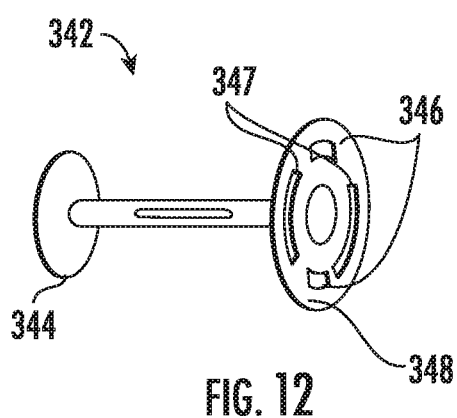
FIG. 12 is a cross-sectional perspective view of the second axle component in FIG. 10, according to an exemplary embodiment.

Turning to FIGS. 10-12, in one embodiment center post 340 includes first post 342 and second post 344. First post 342 includes first cavity 343 to which spring 80 is coupled, and second post 344 includes second cavity 345. At either end of first and second post 342, 344 is interior bearing 348 and exterior bearing 349. First post 342 and second post 344 are releasably coupled together via apertures 346 and protrusions 347. By this coupling, axial rotation of either center post 342, 344 exerts a corresponding rotational force on the other center post 342, 344.

In one embodiment, first center post 342 and second center post 344 are prevented from decoupling by housing 320 preventing either center posts 342, 344 from moving apart. In another embodiment, first and second center posts 342, 344 are fixedly coupled together, such as with a rivet, weld, glue, magnet, etc.

In another embodiment, one or more springs 80 exert a compressive force on center posts 342, 344 along their longitudinal axis. Such springs 80 may be located, for example, at one or both exterior bearings 349 and exert a pushing force against housing 320, which biases center posts 342, 344 together. In another example, such springs 80 could be located between their respective interior bearings 348, and exert a separating force on center posts 342, 344. In these examples, when housing 320 is deformed then springs 80 will at least partly compensate for the deformation and prevent apertures 346 and protrusions 347 from becoming decoupled.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A tape measure comprising:
a housing;
an axle having a longitudinal axis that is rotatably mounted within the housing;
a tape reel rotatably mounted within the housing around the axle, the tape reel comprising a radially inward-facing surface defining first and second spring enclosures, and a radially outward-facing surface, the tape reel further comprising first and second bearing surfaces that axially support the tape reel with respect to the longitudinal axis of the axle, the first and second bearing surfaces interfacing against the axle;
an elongate tape blade wound around the radially outward-facing surface of the tape reel, an internal end of the tape blade is radially further from the axle than the inward-facing surface defining the first spring enclosure;
a hook assembly coupled to an outer end of the elongate tape blade;
a first spiral spring located within the first spring enclosure, the first spiral spring coupled between the cylindrical wall of the housing and the axle such that when the elongate tape blade is unwound from the tape reel to extend from the housing the first spiral spring stores energy, and the first spiral spring releasing energy drives rewinding of the elongate tape blade on to the tape reel; and
a second spiral spring located within the second spring enclosure, the second spiral spring coupled between the tape reel and the axle such that when the elongate tape blade is unwound from the tape reel to extend from the housing the second spiral spring stores energy, and the second spiral spring releasing energy drives rewinding of the elongate tape blade on to the tape reel; and
wherein, during extension and rewinding of the elongate tape blade, both the axle and tape reel rotate within the housing.

2. The tape measure of claim 1, wherein the tape reel comprises first, second and third bearing surfaces that axially support the tape reel with respect to the longitudinal axis of the axle.

3. The tape measure of claim 1, wherein the tape reel further comprises a blade-supporting wall that comprises the radially inward-facing surface, the blade-supporting wall being further in a radial direction from the longitudinal axis of the axle than the first internal bearing surface.

4. The tape measure of claim 1, wherein the tape reel further comprises a blade-supporting wall that comprises the radially inward-facing surface, the blade-supporting wall being further in a radial direction from the longitudinal axis of the axle than the first and second internal bearing surfaces.

5. The tape measure of claim 1, wherein the tape reel further comprises a blade-supporting wall that comprises the radially inward-facing surface, the blade-supporting wall being further in a radial direction from the longitudinal axis of the axle than the first, second and third internal bearing surfaces.

6. The tape measure of claim 1, wherein the axle comprises two center posts that share a longitudinal axis.

7. The tape measure of claim 6, wherein the center posts are rigidly coupled together.

8. The tape measure of claim 6, wherein the two center posts each include an interior bearing wall with protrusions and apertures, and the center posts are coupled together via the respective protrusions and apertures.

9. The tape measure of claim 8, wherein the center posts comprise a third spring exerting a force against the center posts along their longitudinal axes.

10. A tape measure comprising:
a housing comprising a cylindrical internal wall extending inwardly from an exterior wall of the housing, the cylindrical internal wall defining a first spring enclosure;
an axle rotatably mounted within the housing;
a tape reel rotatably mounted within the housing around the axle, the tape reel comprising a radially inward-facing surface defining an interior reel cavity and a radially outward-facing surface;
an elongate tape blade wound around the radially outward-facing surface of the tape reel;
a hook assembly coupled to an outer end of the elongate tape blade;
a first spiral spring located within the first spring enclosure defined by the cylindrical internal wall, the first spiral spring coupled between the cylindrical wall and the axle such that when the elongate tape blade is unwound from the tape reel to extend from the housing the first spiral spring stores energy, and the first spiral spring releasing energy drives rewinding of the elongate tape blade on to the tape reel; and
a second spiral spring located within the interior reel cavity and surrounded by the radially inward-facing surface of the tape reel, the second spiral spring coupled between the tape reel and the axle such that when the elongate tape blade is unwound from the tape reel to extend from the housing the second spiral spring stores energy, and the second spiral spring releasing energy drives rewinding of the elongate tape blade on to the tape reel; and
wherein, during extension and rewinding of the elongate tape blade, both the axle and tape reel rotate within the housing.

11. The tape measure of claim 10, wherein the second spring is coupled via a fastener to a slot in the tape reel.

12. The tape measure of claim 10, wherein the axle comprises two center posts that share a longitudinal axis.

13. The tape measure of claim 10, the tape measure further comprising an attachment piece that is coupled to the tape blade and the tape reel.

14. The tape measure of claim 13, wherein the attachment piece comprises first and second ears that engage with slots in lateral walls of the tape reel.

15. The tape measure of claim 14, wherein a width of the first and second ears is greater than a width between the lateral walls of the tape reel.

16. The tape measure of claim 14, wherein the attachment piece comprises third and fourth ears that engage with the tape blade.

17. The tape measure of claim 10, wherein the two center posts each include an interior bearing wall with protrusions and apertures, and the center posts are coupled together via the respective protrusions and apertures.

18. The tape measure of claim 17, wherein the center posts are rigidly coupled together.

19. A tape measure comprising:
a housing comprising a cylindrical internal protrusion defining a first spring enclosure;
a first axle;
a second axle fixedly coupled to the housing;
a tape reel rotatably mounted within the housing around the first and second axles, the tape reel fixedly coupled to the first axle and comprising a radially outward-facing surface;
an elongate tape blade wound around the radially outward-facing surface of the tape reel;
a hook assembly coupled to an outer end of the elongate tape blade;
a spring spool disposed within tape reel, the spring spool comprising first and second spring compartments;
a first spiral spring located within the first spring compartment, the first spiral spring coupled between the first axle and the tape reel such that when the elongate tape blade is unwound from the tape reel to extend from the housing the first spiral spring stores energy, and the first spiral spring releasing energy drives rewinding of the elongate tape blade on to the tape reel; and
a second spiral spring located within the second spring compartment, the second spiral spring coupled between the tape reel and the second axle such that when the elongate tape blade is unwound from the tape reel to extend from the housing the second spiral spring stores energy, and the second spiral spring releasing energy drives rewinding of the elongate tape blade on to the tape reel; and
wherein, during extension and rewinding of the elongate tape blade, the tape reel, spring spool and first axle rotate within the housing, and
an internal end of the tape blade is radially further from the axle than an outer end of the first spiral spring.

20. The tape measure of claim 19, wherein the spring spool comprises a separation wall between the first spring and the second spring.

21. The tape measure of claim 19, wherein the internal end of the tape blade is radially further from the axle than an outer end of the second spiral spring.

* * * * *